Nov. 30, 1965  F. L. CHRISTENSEN ETAL  3,220,148
ABRASIVE CUTTING DEVICES AND METHOD OF MAKING THE SAME
Filed July 29, 1963  2 Sheets-Sheet 1
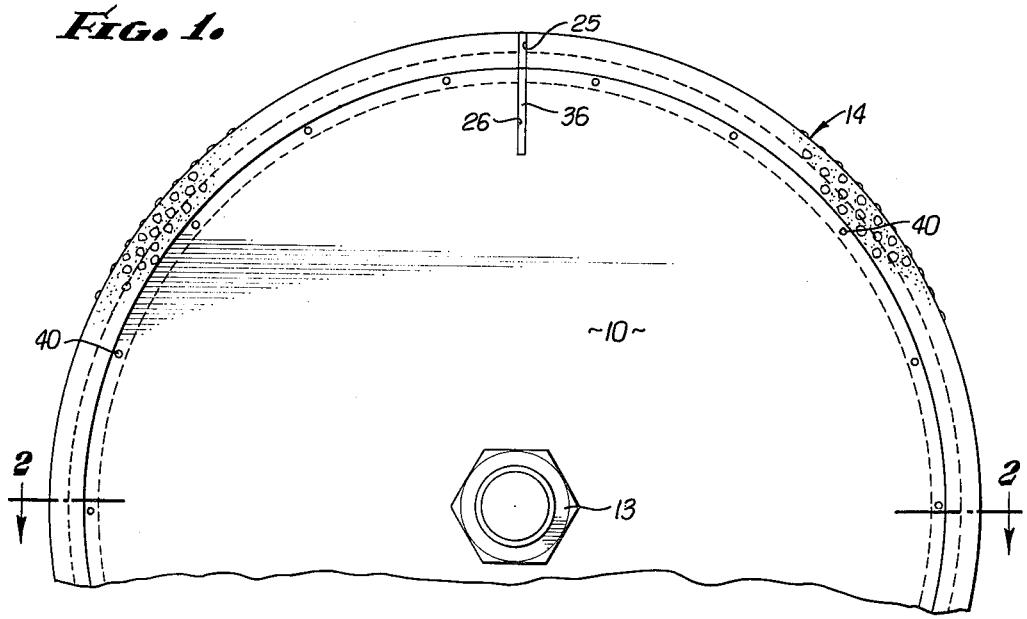
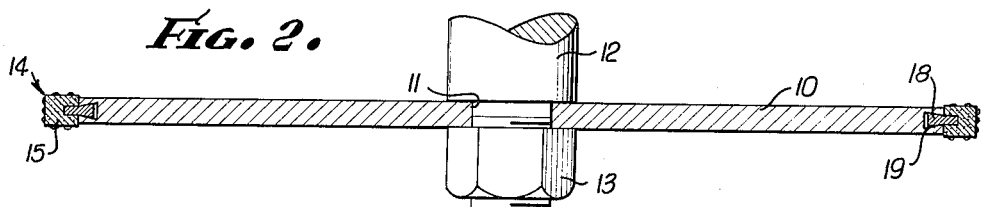
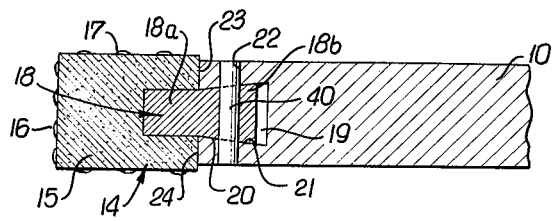
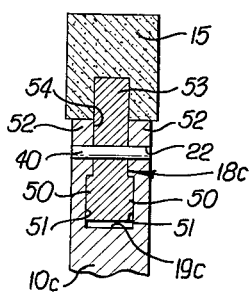
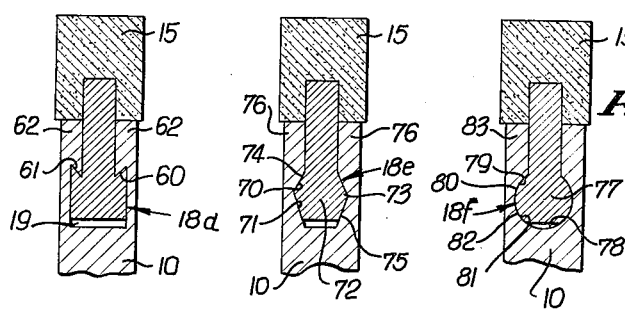
FRANK L. CHRISTENSEN
LAWRENCE FREAR
INVENTORS
BY Bernard Kriegel
ATTORNEY.

Nov. 30, 1965   F. L. CHRISTENSEN ETAL   3,220,148
ABRASIVE CUTTING DEVICES AND METHOD OF MAKING THE SAME
Filed July 29, 1963   2 Sheets-Sheet 2

FRANK L. CHRISTENSEN
LAWRENCE FREAR
INVENTORS.

BY
Bernard Kriegel
ATTORNEY.

United States Patent Office 3,220,148
Patented Nov. 30, 1965

3,220,148
ABRASIVE CUTTING DEVICES AND METHOD OF MAKING THE SAME
Frank L. Christensen, Salt Lake City, and Lawrence Frear, Sandy, Utah, assignors to Christensen Diamond Products Company, Salt Lake City, Utah, a corporation of Utah
Filed July 29, 1963, Ser. No. 298,226
20 Claims. (Cl. 51—206)

The present invention relates to cutting apparatus, and more particularly to saws or milling cutters having abrasive cutting rim portions, such as rim portions comprising diamond impregnated matrices, or matrices with diamonds embedded in their peripheral or side portions.

Cutting saws, and the like, have been proposed embodying a steel disc provided with radial slots at its peripheral portion and cutting segments attached to the disc between its slots, as by a brazing or soldering operation. Such saws sometimes produce fracturing or breaking of the work being cut, and also cut grooves of oversize widths, apparently due to the ability of one or more of the segments to deflect laterally relative to other cutting segments. Oftentimes, the discs fail as a result of cracks originating at the slots and extending inwardly thereof.

An object of the invention is to avoid the above-noted disadvantages of slotted saws by providing cutting saws having circumferentially continuous cutter portions affixed to discs unslotted at their peripheries.

Another object of the invention is to provide a cutting device that is true running and capable of producing a cut in the work of accurate width.

A further object of the invention is to provide a cutting device embodying a cutting rim portion attached to a disc structure, in which the tendency of the disc to crack during operation is considerably minimized, if not eliminated completely.

An additional object of the invention is to provide a cutting device embodying a cutting rim portion attached to a disc in such manner as to avoid impairment of the heat treatment or tension of the disc.

Yet another object of the invention is to provide a cutting device embodying an abrasive cutting rim portion that is accurately attached to a supporting disc with a much stronger union or bond than other similar devices.

Still a further object of the invention is to provide a cutting device embodying an abrasive cutting rim portion affixed to a supporting disc in a manner as to more effectively resist centrifugal forces and torque loads acting on the rim portion and tending to effect its separation from the disc.

Another object of the invention is to provide an improved method of firmly assembling and attaching an abrasive cutting rim to a supporting disc to produce a strong, sturdy and accurate cutting device.

This invention possesses many other advantages and has other objects which may be made more clearly apparent from a consideration of several forms and method embodying the invention. These forms and method are shown and described in the present specification and in the drawings accompanying and constituting a part thereof. They will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a plan view of a portion of a circular saw or mill;

FIG. 2 is a cross-section taken along the line 2—2 on FIG. 1;

FIG. 3 is an enlarged section of a portion of the device disclosed in FIG. 2;

FIG. 4 is a cross-section similar to FIG. 3, on a reduced scale, through a second form of the invention;

FIGS. 5, 6 and 7 are views similar to FIG. 4 of third, fourth and fifth forms, respectively, of the invention;

Figure 8:
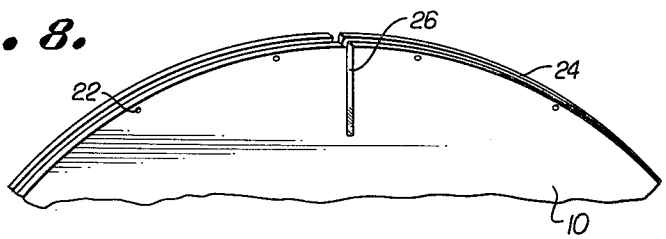
FIG. 8 is an isometric view of a portion of the disc prior to assembly of the cutting rim thereto.

Several embodiments of saws or milling cutters are disclosed in the drawings, in which a disc 10 of steel, or similar material, has a central hole 11 through which a rotating shaft or arbor 12 can pass and to which the disc is suitably secured, as by threading a nut 13 on the shaft. A cutting rim portion 14 is attached to the disc, this rim portion having a width slightly greater than the disc thickness. The rim may include an outer section 15, of diamonds 16, 17 impregnated in a suitable matrix material, such as tungsten carbide, which is attached to an inner anchor ring 18 that may be made of steel, for example. In lieu of a diamond impregated section 15, diamonds 16, 17 may be set in the periphery of the matrix and along its side portions in a suitable pattern or patterns for effectively severing the work or cutting a groove or slot therein. The diamond saws or milling cutters illustrated in the drawings are found to be effective in performing a cutting action on various materials, such as concrete, marble, bricks, granite, slate, fire-brick, and the like.

As shown in the drawings, a connector or anchor ring 18 has the diamond impregnated matrix 15 molded to its outer portion 18a, its inner rib portion 18b being disposed within a peripheral groove 19 in the disc 10. Following disposition of the inner portion 18b of the connector ring in the peripheral groove 19 in the manner described hereinbelow, such inner portion may be bonded to the disc by applying silver brazing material between the side faces 20 of the ring and the sides 21 of the groove. Suitable feeder holes 22 may be provided in the marginal portions of the disc through which the brazing material, such as silver solder, can be fed to the contacting faces 20, 21 of the anchor ring and the disc groove.

The disc 10 is of one piece and has the peripheral groove 19 of the desired shape machined or formed in it. The diamond impregnated matrix rim 15 is molded to the steel anchor ring 18, and the inner portion 18b of the steel anchor ring machined to conform to the shape of the peripheral groove 19 in the disc, the anchor or connector ring 18 being disposed in the central plane of the matrix 15 and the width of the diamond impregnated matrix rim preferably being greater than the width or thickness of the disc 10 to which it is to be secured. The inner surface 23 of the diamond impregnated matrix rim conforms to the perimeter 24 of the disc, and, as stated above, the dimensions of the inner portion 18b of the connector ring conform substantially to the dimensions of the female groove 19 machined in the periphery of the steel disc.

Figure 11:
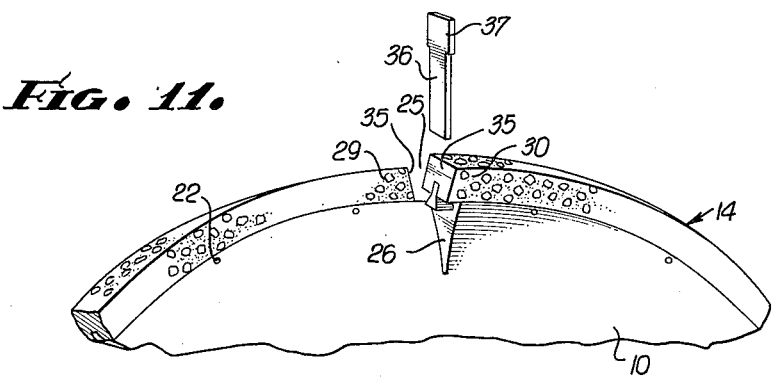
FIG. 11 is a view similar to FIG. 10 with the rim portion almost completely assembled on the disc.
Figure 12:
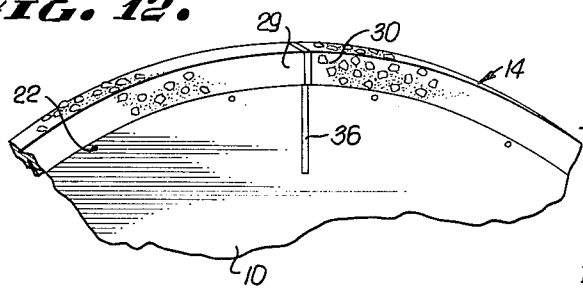
FIG. 12 is an isometric view of the complete assembly of the rim portion on the disc.

The rim and connector ring 14 are severed at one place by cutting a radial slot 25 (FIG. 11) therethrough, and a similar radial slot 26 is cut from the outer periphery 24 of the disc inwardly toward its axis.

Figure 9:
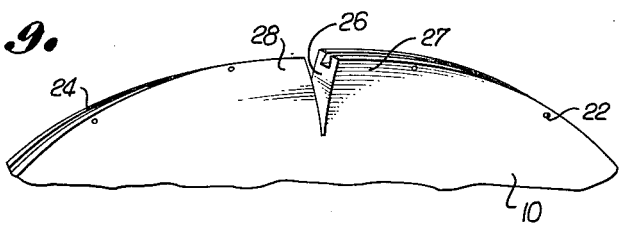
FIG. 9 is a view similar to FIG. 8 disclosing a modified condition of the disc prior to insertion of the rim portion thereon.
Figure 10:
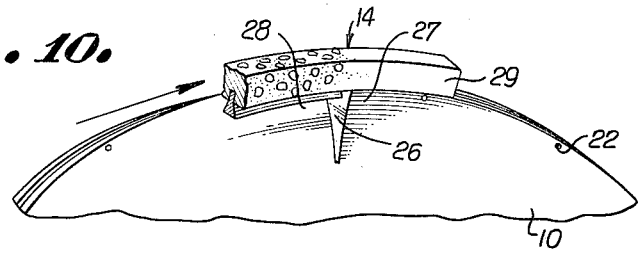
FIG. 10 is a view similar to FIGS. 8 and 9 disclosing the rim portion being assembled on the disc.

The partially slotted steel disc is placed in a suitable fixture (not shown) and the disc portions 27, 28 on both sides of its slot are deflected laterally in opposite directions, so that such disc portions 27, 28 are fully out of alignment with one another, such as disclosed in FIG. 9. The end portions 29, 30 of the anchor ring 14 on opposite sides of its slot 25 are deflected laterally in opposite directions out of alignment and one end portion 29 then inserted in the disc groove 19 (FIG. 10) and the ring 18 and attached diamond impregnated matrix 15 fed around the disc, with the inner portion 18b of the anchor ring 18 feeding into and sliding in the groove 19 until the entire ring has been mounted in the disc groove (FIG. 11) with the opposed ends 35 of the ring aligned with the sides of the slot 26 cut in the disc.

The disc portions 27, 28 are then deflected back to their initial, coplanar condition and a metal key 36, such as a steel key, having substantially the same thickness as the width of the slot 25 in the rim 15 and the slot 26 in the disc, is then inserted in such slots, this key having an outer head 37 conforming in shape to a radial cross-section of the diamond impregnated rim 15 and an inner leg conforming in width to the thicknes of the disc. As shown in the drawings, the key 36 is T-shaped. As stated above, the key is inserted in the slots 25, 26 after the rim and the disc are deflected back to their initial position, so that all portions of the rim and disc are in alignment and lie in the same central plane. The steel key is brazed in place to both the rim and anchor ring 14 and to the confronting faces of the disc on opposite sides of the slot 26, firmly securing all portions of the saw together.

The key 36 prevents the ring 14 from turning or shifting circumferentially in the disc 10 and it also assists in transmitting torque from the disc to the diamond impregnated rim 15 and its steel anchor ring 18. Suitable soldering material is then inserted through the feeder holes 22 in the disc to the confronting faces 20, 21 between the steel anchor ring 18 and the walls of the peripheral groove 19 to firmly bond the steel anchor ring to the disc. If desired, the inner circumferential surface 23 of the diamond impregnated matrix can also be brazed to the periphery 24 of the disc.

In the specific saw or milling cutter device illustrated in FIG. 3, a dovetail connection 18b, 19 is provided between the connector ring 18 and the disc 19. Thus, the peripheral or circumferential groove 19 in the disc has side walls 21 tapering outwardly toward each other, and the inner tongue 18b of the anchor ring is correspondingly shaped, having tapered side walls 20 that contact and conform to the side walls of the disc. In addition to the soldering of the opposed surfaces 20 of the anchor ring tongue portion 18b to the disc after the split ring 18 has been inserted into the dovetail groove 19 in the disc, additional attachment can be provided by securing the anchor ring to the disc through use of circumferentially spaced rivets 40 which may be placed through the feeder holes 22 and through the inner ring portion 18b.

During the soldering of the connection ring 18 to the disc, the sides of the disc at its groove 19 are progressively forced toward each other where the solder is being applied to insure an intimate solder connection with the sides 20, 21 of the tongue 18b and groove 19. The sides of the disc are also forced toward each other during the driving of the rivets 40 to insure intimate contact between the tongue 18b and walls of the groove 19.

In the use of the saw or milling cutter device illustrated in FIGS. 1 to 3, the circumferentially continuous diamond impregnated cutter rim 15 does not fracture or break the work being cut, because of lack of interruption around its circumference. In addition, the rim 15 runs true and in a single plane, cutting accurately into the work with a precise width. Since there are no interruptions in the cutting surface or in the disc 10, there are no places where cracking in the disc might be induced. Ordinarily, the disc is made of heat-treated steel and since the parts can be soldered to one another with a relatively low temperature silver solder, or the like, which is below any temperature that will adversely affect the disc, the heat treatment or tension in the latter is not destroyed or impaired. Since the steel ring 18 is soldered to the disc 10, a much stronger bond or union therebetween is provided, as compared with the soldering of the matrix 15 alone to the disc, as in prior devices. Moreover, the undercut or dovetail tongue and groove interconnection 18b, 19 between the ring and the disc provides resistance to the action of centrifugal force tending to effect separation therebetween, by virtue of contact of the tapered sides 20 of the tongue with the companion outwardly converging sides 21 of the disc groove 19. Moreover, greater torque loads can be transmitted since the inclined surfaces 20, 21 provide a greater bonding area between the inwardly projecting connector ring portion 18b and the adjacent side walls of the disc. The use of the steel connector ring 18 for insertion in the disc groove 19 facilitates assembly of the parts, since the steel ring is more flexible and is less susceptible to cracking or breaking during its lateral deflection and feeding into the companion circumferential groove in the disc. The extent of deflection of the disc portions 27, 28 and of the ring 14 is preferably insufficient to exceed the yield points of the materials from which they are made.

In the form of invention illustrated in FIG. 4, essentially the same saw device is provided as in the dovetail form previously described. However, the connector ring 18c and companion groove 19c in the disc 10c are shaped differently. Thus, the connector ring 18c is T-shaped in cross-section, the side flanges 50 of the head of the T projecting into opposed circumferentially continuous grooves 51 formed in the disc and into which the ring 18c, when split, can be fed circumferentially in assembling the ring to the disc, in the same manner as illustrated in FIGS. 8 to 12. After the ring has been fully assembled in the disc, the peripheral margins 52 of the disc can be forced toward one another while the steel connector ring 18c is soldered to the disc, as by introducing the brazing material into feeder holes 22 and into the groove sections 51 and to the sides of the outer leg portion 53 and the adjacent side walls 54 of the slot or groove at the peripheral portion of the disc. The structure can also be secured together by rivets 40 passing through the disc on opposite sides of its groove and through the connector ring 18c.

In the form of invention disclosed in FIG. 4, centrifugal force does not tend to expand the disc, as might occur with the tapered side wall construction 20, 21 shown in the previously described embodiment of the invention.

The form of invention disclosed in FIG. 5 is similar to FIG. 4, except that the outer sides 60 of the opposed grooves converge toward each other in a direction toward the axis of the disc and the outer sides 61 of the head converge toward each other in a similar manner, being engageable with the converging sides 60 of the groove. Thus, a hook-type of connection between the anchor ring 18d and the disc portions on opposite sides of the peripheral slot 19 are provided, which has the effect of tending to pull the opposed sides 62 of the disc inwardly toward each other under the action of centrifugal force, to prevent separation of the brazed connection between the disc 10 and the connector ring 18d, as opposed to the separating tendency of the outwardly converging sides illustrated in the dovetail configuration of FIG. 3.

In the form of invention illustrated in FIG. 6, the connector ring 18e and disc groove have still a different configuration. The outer sides 70 of the grooves on opposide sides of the central slot are tapered toward each other in a radial outward direction and the inner sides 71 of the grooves are tapered toward each other in a radial inward direction. The generally T-shaped connector ring 18e has its head portion 72 provided with opposed flanges or tongues 73 fitting within the opposed grooves 70, 71 of the disc. The outer sides 74 of the head taper in conformance with the outer sides 70 of the grooves and the inner sides 75 of the head taper in conformance with the inner sides 71 of the grooves.

During the riveting or soldering of the disc 10 to the connector ring 18e, the application of axial pressure on the outer sides 76 of the disc, to force such sides toward each other, will cause the tapered surfaces 70, 74 to coengage and urge the connector member 18e inwardly to insure a snug engagement of the inner tapered surfaces 75 of the head with the companion tapered inner surfaces 71 of the grooves, insuring a wedging of the connector ring in the disc and its maintenance in snug and firm engagement with the disc. The introduction of the solder into the grooves will insure a firm bonding of the connector ring 18e to the disc 10 and the retention of all of the parts in their snug relation.

In the form of invention illustrated in FIG. 7, the inner portion 77 of the connector ring 18f is generally circular in cross-section, fitting within a toroidal shaped inner groove portion 78 of the disc. In effect, curved companion outer surfaces 79, 80 are formed at the outer sides of the grooves and the outer sides of the head of the connector ring that converges in a radial outward direction, and curved inner surfaces 81 are provided in the opposed disc grooves conforming to similar surfaces 82 on the inner portion of the connector ring head 77. The axial pressing of the disc portions 83 on opposite sides of the peripheral groove toward each other will cause the outer surfaces 79, 80 to coengage and tend to shift the head 77 inwardly to hold the inner surfaces 81, 82 in snug coengagement with each other. With such pressure being maintained, the connector ring can be brazed to the disc or secured thereto by rivets, or by use of both types of fasteners.

In the toroidal type of connection illustrated in FIG. 7, essentially the same action occurs as in the form of invention illustrated in FIG. 6. The advantage of the toroidal arrangement is that sharp corners are minimized at which fatigue failures might possibly develop.

In all forms of the invention, the outer ring portion can be assembled to the disc 10 in the same manner as illustrated in FIGS. 8 to 12, including the insertion of the key 36, its brazing to the disc 10 and ring, as well as the brazing, or riveting, or both, of the connector ring to the disc by feeding solder into the peripheral groove portion of the latter. If desired, the inner surfaces 23 of the matrix can also be brazed to the perimeter 24 of the disc on opposite sides of its peripheral groove.

We claim:

1. In an abrasive cutting apparatus: a one-piece rotatable disc having a circumferentially continuous groove extending inwardly from its periphery; said disc having a central hole and being imperforate between said hole and groove; a circumferentially continuous annular abrasive cutting device including a separate and distinct metallic annular abrasive cutting rim portion overlying the periphery of said disc and said rim portion and an inner rib disposed in said groove and secured to said disc.

2. In an abrasive cutting apparatus: a one-piece rotatable disc having a circumferentially continuous groove extending inwardly from its periphery; said disc having a central hole and being imperforate between said hole and groove; a circumferentially continuous annular abrasive cutting device including an outer rim matrix portion overlying the periphery of said disc and extending axially at least to the outer sides of said disc, diamond cutting elements embedded in said matrix portion, said cutting device further including a separate and distinct metallic rib bonded to said matrix portion and disposed in said groove and secured to said disc.

3. In an abrasive cutting apparatus: a rotatable disc having a generally radial slot extending inwardly from its periphery and a circumferentially continuous groove extending inwardly from its periphery and terminating at said slot; a split, circumferentially continuous annular abrasive cutting device including an outer abrasive cutting rim portion and an inner rib secured to said rim portion, said inner rib being adapted to be fed circumferentially into said groove from said slot to place the full circumference of said rib in said groove and said rim portion in overlying relation to the periphery of said disc; and means securing said rib to said disc.

4. In an abrasive cutting apparatus: a rotatable disc having a generally radial slot extending inwardly from its periphery and a circumferentially continuous groove extending inwardly from its periphery and terminating at said slot; a split, circumferentially continuous annular abrasive cutting device including an outer abrasive cutting rim portion and an inner rib secured to said rim portion, said inner rib being adapted to be fed circumferentially into said groove from said slot to place the full circumference of said rib in said groove and said rim portion in overlying relation to the periphery of said disc; means securing said rib to said disc; and means interconnecting the portions of said disc on opposite sides of said slot.

5. In an abrasive cutting apparatus: a rotatable disc having a generally raidal slot extending inwardly from its periphery and a circumferentially continuous groove extending inwardly from its periphery and terminating at said slot; a split, circumferentially continuous annular abrasive cutting device including an outer rim matrix portion and an inner metallic rib bonded to said rim portion, diamond cutting elements embedded in said matrix portion, said inner rib being adapted to be fed circumferentially into said groove from said slot to place the full circumference of said rib in said groove and said matrix portion in overlying relation to the periphery of said disc, said matrix portion extending axially at least to the outer sides of said disc; and means securing said rib to said disc.

6. In an abrasive cutting apparatus: a rotatable disc having a generally radial slot extending inwardly from its periphery and a circumferentially continuous groove extending inwardly from its periphery and terminating at said slot; a split, circumferentially continuous annular abrasive cutting device including an outer rim matrix portion and an inner metallic rib bonded to said rim portion, diamond cutting elements embedded in said matrix portion, said inner rib being adapted to be fed circumferentially into said groove from said slot to place the full circumference of said rib in said groove and said matrix portion in overlying relation to the periphery of said disc, said matrix portion extending axially at least to the outer sides of said disc; means securing said rib to said disc; and means interconnecting the portions of said disc on opposite sides of said slot.

7. In an abrasive cutting apparatus: a one-piece rotatable disc having a circumferentially continuous undercut groove extending inwardly from its periphery; said disc having a central hole and being imperforate between said hole and groove; an annular abrasive cutting device including an outer abrasive cutting rim portion overlying the periphery of said disc and a separate and distinct metallic inner rib disposed in said groove and secured to said rim portion and to said disc, said rib conforming in cross-sectional shape to the cross-sectional shape of said undercut groove.

8. In an abrasive cutting apparatus: a one-piece rotatable disc member; a circumferentially continuous annular abrasive cutting device including an outer abrasive cutting rim portion and a separate and distinct metallic inner connector member secured to said rim portion; one of said members having a circumferentially continuous groove and said other member having a companion rib disposed in said groove with said rim portion overlying the periphery of said disc member; and means securing said rib to said one of said members; said disc member having a central hole and being imperforate between said hole and said rib and groove.

9. In an abrasive cutting apparatus: a one-piece rotatable disc member; a circumferentially continuous annular abrasive cutting device including an outer abrasive cutting rim portion and a separate and distinct metallic inner connector member secured to said rim portion; one of said members having a circumferentially continuous undercut groove extending inwardly from its periphery and said other member having a companion rib disposed in said groove with said rim portion overlying the periphery of said disc member, said rib conforming in cross-sectional shape to the cross-sectional shape of said undercut groove; and means securing said rib to said one of said members; said disc member having a central hole and being imperforate between said hole and said rib and groove.

10. In an abrasive cutting apparatus: a rotatable disc member having a generally radial slot extending inwardly from its periphery; a split, circumferentially continuous annular abrasive cutting device including an outer abrasive cutting rim portion and an inner connector member secured to said rim portion; one of said members having a circumferentially continuous groove and said other member having a companion rib adapted to be fed relatively circumferentially into said groove from an end thereof to place the full circumference of said rib in said groove and said rim portion in overlying relation to the periphery of said disc member; and means securing said rib to said one of said members.

11. In an abrasive cutting apparatus: a rotatable disc member having a generally radial slot extending inwardly from its periphery; a split, circumferentially continuous annular abrasive cutting device including an outer abrasive cutting rim portion and an inner connector member secured to said rim portion; one of said members having a circumferentially continuous undercut groove and said other member having a companion rib adapted to be fed relatively circumferentially into said undercut groove from an end thereof to place the full circumference of said rib in said groove and said rim portion in overlying relation to the periphery of said disc member, said rib conforming in cross-sectional shape to the cross-sectional shape of said undercut groove; and means securing said rib to said one of said members.

12. In an abrasive cutting apparatus: a rotatable disc having a generally radial slot extending inwardly from its periphery and a circumferentially continuous groove dovetail in cross-section extending inwardly from its periphery and terminating at said slot; a split, circumferentially continuous annular abrasive cutting device including an outer abrasive cutting rim and an inner rib secured to said rim portion, said rib conforming in cross-sectional shape to the cross-sectional shape of said dovetail groove, said inner rib being adapted to be fed circumferentially into said groove from said slot to place the full circumference of said rib in said groove and said rim portion in overlying relation to the periphery of said disc; and means securing said rib to said disc.

13. In an abrasive cutting apparatus: a rotatable disc having a generally radial slot extending inwardly from its periphery and a circumferentially continuous groove T-shaped in cross-section and extending inwardly from its periphery and terminating at said slot; a split, circumferentially continuous annular abrasive cutting device including an outer abrasive cutting rim portion and an inner rib secured to said rim portion, said rib conforming in cross-sectional shape to the cross-sectional shape of said T-shaped groove, said inner rib being adapted to be fed circumferentially into said groove from said slot to place the full circumference of said rib into said groove and said rim portion in overlying relation to the periphery of said disc; and means securing said rib to said disc.

14. In an abrasive cutting apparatus: a rotatable disc having a generally radial slot extending inwardly from its periphery and a circumferentially continuous groove T-shaped in cross-section and extending inwardly from its periphery and terminating at said slot; a split, circumferentially continuous annular abrasive cutting device including an outer abrasive cutting rim portion and an inner rib secured to said rim portion, said rib conforming in cross-sectional shape to the cross-sectional shape of said T-shaped groove, said inner rib being adapted to be fed circumferentially into said groove from said slot to place the full circumference of said rib into said groove and said rim portion in overlying relation to the periphery of said disc; means securing said rib to said disc, the outer sides of the inner portion of said groove tapering toward each other in a radial inward direction and the outer sides of the inner portion of said T-shaped rib tapering in the same direction as said outer sides of said groove and engaging said tapered sides of said groove.

15. In an abrasive cutting apparatus: a rotatable disc having a generally radial slot extending inwardly from its periphery and a circumferentially continuous groove T-shaped in cross-section and extending inwardly from its periphery and terminating at said slot; a split, circumferentially continuous annular abrasive cutting device including an outer abrasive cutting rim portion and an inner rib secured to said rim portion, said rib conforming in cross-sectional shape to the cross-sectional shape of said T-shaped groove, said inner rib being adapted to be fed circumferentially into said groove from said slot to place the full circumference of said rib into said groove and said rim portion in overlying relation to the periphery of said disc; means securing said rib to said disc, the outer sides of the inner portion of said T-shaped groove tapering toward each other in a radial outward direction, the inner sides of the inner portion of said T-shaped groove tapering inwardly toward each other radially inwardly of said disc, the inner portion of said T-shaped rib having outer and inner sides conforming to and engaging said outer and inner sides of said groove.

16. In an abrasive cutting apparatus: a rotatable disc having a generally radial slot extending inwardly from its periphery and a circumferentially continuous groove T-shaped in cross-section and extending inwardly from its periphery and terminating at said slot; a split, circumferentially continuous annular abrasive cutting device including an outer abrasive cutting rim portion and an inner rib secured to said rim portion, said rib conforming in cross-sectional shape to the cross-sectional shape of said T-shaped groove, said inner rib being adapted to be fed circumferentially into said groove from said slot to place the full circumference of said rib into said groove and said rim portion in overlying relation to the periphery of said disc; means securing said rib to said disc, the inner portion of said T-shaped groove being of generally toroidal shape, the inner portion of said T-shaped rib being of companion toroidal shape and engageable with the toroidal surface of said groove.

17. A method of making an abrasive cutting apparatus, comprising providing a disc having a generally radial slot extending inwardly from its periphery and a circumferentially continuous groove extending inwardly from its periphery and terminating at said slot, providing a split, circumferentially continuous annular abrasive cutting device including an outer abrasive cutting rim portion and an inner rib, deflecting said disc at said slot laterally to expose an end of said groove, feeding said rib into said exposed end of said groove and circumferentially in said groove to place the full circumference of said rib in said groove and said rim portion in overlying relation to the periphery of said disc, deflecting said disc at said slot back to its initial position, and securing said rib to said disc.

18. A method of making an abrasive cutting apparatus, comprising providing a disc having a generally radial slot extending inwardly from its periphery and a circumferentially continuous undercut groove extending inwardly from its periphery and terminating at said slot, providing a split, circumferentially continuous annular abrasive cutting device including an outer abrasive rim portion and an inner rib conforming in cross-sectional shape to the cross-sectional shape of said undercut groove, deflecting said disc at said slot laterally to expose an end of said groove, feeding said rib into said exposed end of said groove and circumferentially in said groove to place the full circumference of said rib in said groove and said rim portion in overlying relation to the periphery of said disc, deflecting said disc at said slot back to its initial position, and securing said rib to said disc.

19. A method of making an abrasive cutting apparatus, comprising providing a disc member having a generally radial slot extending inwardly from its periphery, providing a split, circumferentially continuous annular abrasive cutting device including an outer abrasive cutting rim portion and an inner connector member secured to said rim portion, one of said members having a circumferentially continuous groove and said other member having a companion rib, deflecting said disc member at said slot laterally to expose an end of said disc member, deflecting said abrasive cutting device laterally at its split to expose an end thereof, whereby an end of said groove is exposed and an end of said rib is also exposed, relatively feeding said rib into said exposed end of said groove and circumferentially in said groove to place the full circumference of said rib in said groove and said rim portion in overlying relation to the periphery of said disc member, deflecting said disc member back to its initial position, and securing said rib to said one of said members.

20. A method of making an abrasive cutting apparatus, comprising providing a disc member having a generally radial slot extending inwardly from its periphery, providing a split, circumferentially continuous annular abrasive cutting device including an outer abrasive cutting rim portion and an inner connector member secured to said rim portion, one of said members having a circumferentially continuous undercut groove and said other member having a companion rib conforming in cross-sectional shape to the cross-sectional shape of said undercut groove, deflecting said disc member at said slot laterally to expose an end of said disc member, deflecting said abrasive cutting device laterally at its split to expose an end thereof, whereby an end of said groove is exposed and an end of said rib is also exposed, relatively feeding said rib into said exposed end of said groove and circumferentially in said groove to place the full circumference of said rib in said groove and said rim portion in overlying relation to the periphery of said disc member, deflecting said disc member back to its initial position, and securing said rib to said one of said members.

References Cited by the Examiner
UNITED STATES PATENTS

| | | | |
|---|---|---|---|
| 2,044,442 | 6/1936 | Offenbacher | 51—206 |
| 2,800,753 | 7/1957 | Hollstrom | 51—206 |
| 3,162,187 | 12/1964 | Christensen | 125—15 |

ROBERT C. RIORDON, *Primary Examiner.*

LESTER M. SWINGLE, *Examiner.*